Patented July 26, 1932

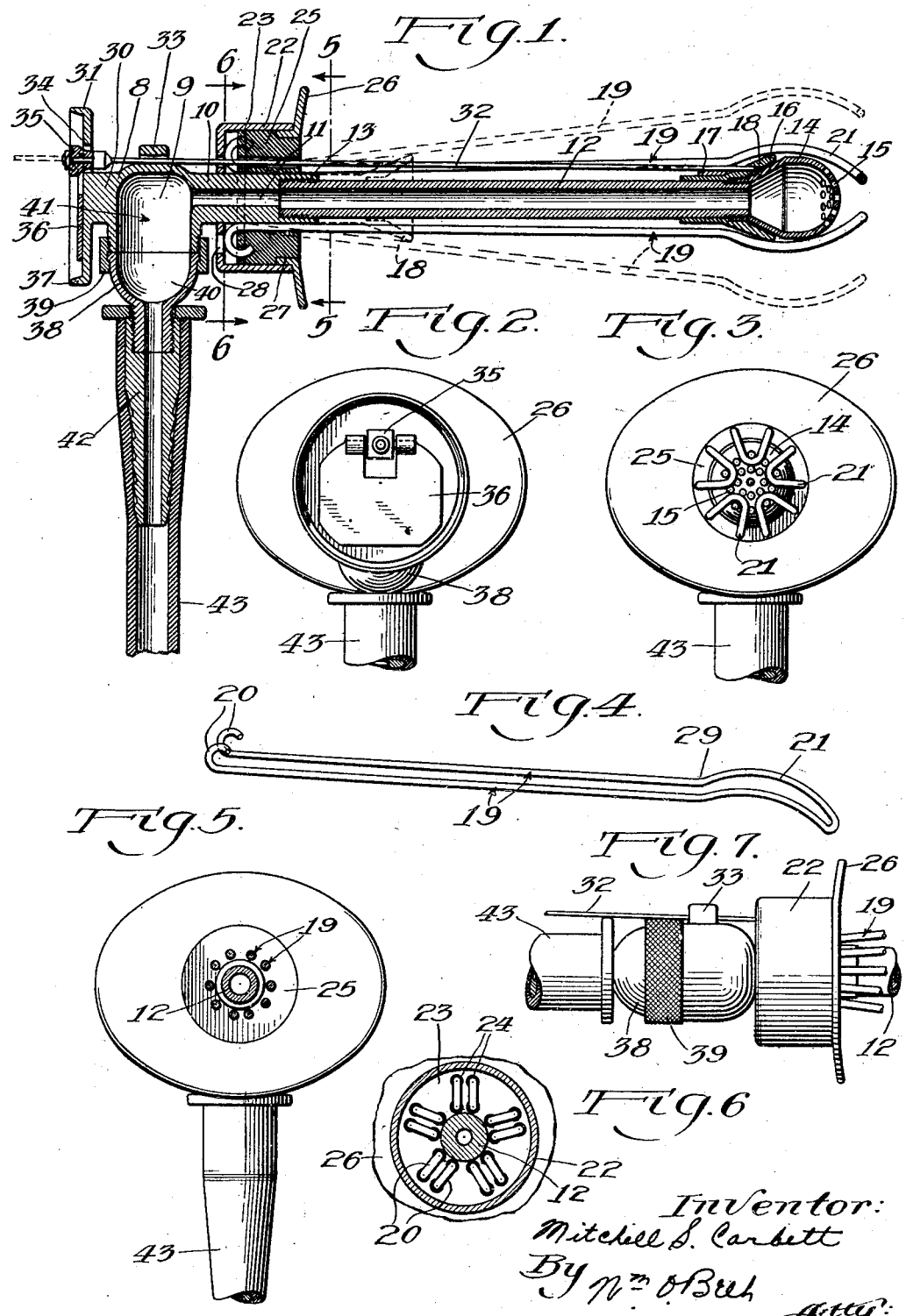
July 26, 1932.    M. S. CORBETT    1,868,728
VAGINAL DOUCHE
Filed July 20, 1931

1,868,728

UNITED STATES PATENT OFFICE

MITCHELL S. CORBETT, OF CHICAGO, ILLINOIS

VAGINAL DOUCHE

Application filed July 20, 1931. Serial No. 551,863

This invention relates to certain novel improvements in vaginal douches especially adapted for antiseptic and hygenic use.

The principal objects of the invention are to provide a novel douche, economical in construction and efficient and simple in operation, which will have distendable portions for dilating the organ into which the douche is inserted; wherein the distendable portions may be expanded without retracting the discharge nozzle; and wherein a chamber will be provided into which a soluble antiseptic substance may be introduced to be dissolved by the fluid passing to the discharge nozzle.

In a selected embodiment of the invention illustrated in the accompanying drawing Fig. 1 is a longitudinal sectional view;

Fig. 2 is a view looking in at the left hand end of Fig. 1;

Fig. 3 is a view looking in at the right hand end of Fig. 1;

Fig. 4 is a perspective detail view of one of the distenders;

Fig. 5 is a sectional view taken substantially on the line 5—5 of Fig. 1;

Fig. 6 is a sectional view taken substantially on the line 6—6 of Fig. 1; and

Fig. 7 is a fragmentary elevational view of a modified form of construction.

In the selected embodiment of the invention illustrated in the accompanying drawing, 8 indicates a body having a recess 9 therein. A neck 10 extends from the body and has a passage 11 therein communicating with the recess 9. A tube 12 is screw-threaded to the end of the neck 10, as indicated at 13, and has a spherical body at the outer end thereof having openings 15 therein to provide a discharge nozzle 14. The portion 16 of the nozzle 14 adjacent the end of the tube 12 is of substantially conical formation. A slide or distending means 17 is mounted on the tube 12 and includes a substantially conical portion 18 which normally rests on the conical portion 16. The slide 17 also includes a neck and it is therefore substantially funnel-shaped. The distenders 19 (Fig. 4) provide the distendable portions of the douche and consist of a rod bent to provide two coextensive portions having hooks 20 at the free ends thereof and the portions of the distenders 19, opposite the hooks 20 and adjacent the bights therein, are formed to conform to the shape of the discharge nozzle as indicated at 21. The main extent of the distenders is normally parallel with the tube 12 and the formed portions 21 embrace and extend slightly beyond the body 14. About the neck 10 adjacent the body 8 is a housing 22 having a central opening therein in which the neck 10 is neatly fitted. In the housing 22, slightly spaced from the bottom thereof, is a metal plate 23 having openings 24 therein in which the hooks 20 are arranged so that the bight of the hooks will rest against the bottom of the housing 22 and this, in cooperation with the extension of the free ends of the hooks slightly beyond the plate 23 to overhang the adjacent portions thereof, retains the distenders 19 in position. The portion of the housing 22 above the plate 23 is filled with a yieldable substance such as vulcanized rubber, indicated by 25, and the distenders pass through this yieldable substance which acts thereon to force the distenders toward the tube 12 and into the position illustrated in full lines in Fig. 1. A substantially oval shaped and slightly dished plate 26 includes a central opening through which a portion of the rubber 25 and the distenders 19 project and this plate has a neck 27 which extends into the housing 22. In the bottom of the housing 22 a plurality of openings 28 are provided for a purpose which will be brought forth presently. When the distenders 19 are in the full line position of Fig. 1, it is manifest that the shoulders 29 thereon, defined by the juncture of the formed portions 21 with the main extent thereof, rest on the slide 17. When the slide 17 is moved along the tube 12, toward the body 8, the conical shaped portion 18 thereof acts on the distenders 19 to expand the same outwardly into the position illustrated in dotted lines in Fig. 1 against the action of the rubber 25, the distenders being fulcrumed on the plate 23. However, when the slide 17 is moved back into the position illustrated in Fig. 1, the rubber 25 will act to force the distenders back into the full line position of Fig. 1. On the body 8 opposite the neck 10 is a boss 30 having a circular plate 31 thereon. A rod 32 is joined to the slide 17 and extends through openings in the rubber 25, plate 23 and bottom of housing 22, through a guide passage in a boss 33 on the body 8, and through an opening 34 in the plate 31. A nut 35 is secured on the end of the rod 32 extending through the opening 34 and a handle 36 is pivotally mounted on the nut. Normally, the handle 36 rests within the confines of the peripheral rim 37 of the plate 31. A nipple 38 has a peripheral ring thereon engaged by a shoulder in the collar 39 which engages screw threads on the body 8 and connects the nipple 38 to said body whereby the recess 40 in the nipple will cooperate with the recess 9 to define a chamber 41. Secured to the nipple 38 is a connector 42 to which one end of a flexible tube 43 is detachably connected.

In use, the collar 39 is detached from the body 8 whereby the nipple 38 may be removed and a tablet or the like of a soluble antiseptic substance is introduced into the chamber 41 after which the collar 39 is tightened to interconnect the nipple 38 and the body 8. The flexible tube 43 will be joined to the connector 42 and a fluid such as water at the proper temperature and under sufficient head is caused to flow through the chamber 41. Preferably a suitable valve (not shown) is provided in the tube 43 adjacent the connector 42 to permit control of the flow of the water. Water flowing into the chamber 41 will dissolve the substance therein and will consequently be rendered antiseptic. This antiseptic water will flow through the passage 11, tube 12, and out through the openings 15 in the nozzle 14. The device will first have been inserted after which the handle 36 will have been gripped and pulled outwardly whereby the rod 32 will have caused the distending means or slide 17 to move along the tube 12 to thereby expand the distenders 19. It is manifest that the expansion of the distenders or distendable portions of the douche is greatest adjacent the discharge nozzle and consequently the water will be discharged at the point where the dilation is greatest. The water discharged from the nozzle will impinge on and cleanse the dilated portions and will then flow out toward the plate 26. Any water that may flow along the rod 32 and past the distenders 19 will be discharged from the housing 22 through the openings 28. By moving the handle 36 back toward the plate 31, the distenders will be moved back into the full line position of Fig. 1 whereupon the device may be easily removed.

In Fig. 7, I have shown a modified form of construction and herein the boss 30 is omitted from the body 8 and the chamber 9 is arranged to extend in alinement with the neck 10. The nipple 38 and connector 42 are therefore arranged in alinement with the tube 12 rather than extending at right angles thereto as illustrated in Fig. 1. Otherwise the construction of the device is the same.

It is manifest from the foregoing description that I have provided a device wherein the distendable portions may be expanded without retracting the discharge nozzle and therefore the discharge from the nozzle may be made in the region where the expansion and the resulting dilation is greatest. Furthermore, by introducing the soluble antiseptic substance into the device, an antiseptic discharge may be made through the nozzle.

While I have illustrated and described the preferred forms of construction for carrying my invention into effect, it is to be understood that the device is capable of variation and modification and I therefore do not wish to be limited to the precise details set forth but desire to avail myself of such changes and alterations as fall within the purview of the following claims:

I claim:

1. In a device of the class described, a body having a recess therein and including a fluid inlet, a nipple having a recess therein, means connecting said nipple to said body whereby said recesses form a chamber, a tube extending from said body and communicating with said chamber and having a discharge nozzle at the end thereof whereby a fluid passing through said inlet, chamber, and tube will flow from said discharge nozzle, distendable portions extending from said body substantially parallel with said tube and terminating adjacent said nozzle, and means for expanding said distendable portions away from said tube and said nozzle.

2. In a device of the class described, a tube having a discharge nozzle at one end thereof and a housing adjacent the other end, a plurality of distendable members extending from said housing and along said tube toward said discharge nozzle, means pivotally mounting the ends of said distendable members in said housing, yieldable means urging said distendable members toward said tube, and means including a flared member slidable along said tube between said discharge nozzle and housing and engageable with said distendable members to expand said distendable members away from said tube and discharge nozzle.

3. In a device of the class described, a tube having a discharge nozzle at one end thereof and a housing adjacent the other end, a plurality of distendable members extending from said housing and along said tube toward said discharge nozzle, means pivotally mounting the ends of said distendable members in said housing, a yieldable substance in said housing and embedding the portions of said distendable members extending therethrough, said yieldable substance acting on said distendable members to urge said members toward said tube, a flared member slidable along said tube between said discharge nozzle and housing and engaged with said distendable members, and means for moving said flared member along said tube whereby as said flared member is moved toward said housing said distendable members are expanded away from said tube.

MITCHELL S. CORBETT.